United States Patent
Claypoole et al.

(10) Patent No.: US 6,959,817 B2
(45) Date of Patent: Nov. 1, 2005

(54) COOLING MAKEUP WATER INTAKE CARTRIDGE FILTER FOR INDUSTRY

(75) Inventors: George T. Claypoole, Bridgeville, PA (US); Dugald L. M. Morrison, Brooklyn, NY (US)

(73) Assignee: Orion Power Holdings, Baltimore, MD (US)

(*) Notice: Subject to any disclaimer, the term of this patent is extended or adjusted under 35 U.S.C. 154(b) by 135 days.

(21) Appl. No.: 10/153,295

(22) Filed: May 22, 2002

(65) Prior Publication Data

US 2003/0010704 A1 Jan. 16, 2003

Related U.S. Application Data

(60) Provisional application No. 60/305,543, filed on Jul. 13, 2001.

(51) Int. Cl.[7] ............................................. B01D 29/33
(52) U.S. Cl. ...................... 210/356; 210/411; 210/486; 210/489; 210/496; 210/499; 210/170
(58) Field of Search ........................... 210/317, 333.01, 210/340, 341, 346, 356, 409, 411, 486, 489, 495, 499, 154, 155, 158, 162, 170, 328, 329, 335, 347, 484, 485, 490, 491, 496; 442/268

(56) References Cited

U.S. PATENT DOCUMENTS

| | | | |
|---|---|---|---|
| 330,154 A | | 11/1885 | Oldham |
| 1,662,726 A | * | 3/1928 | Jean ............................ 210/411 |
| 2,249,063 A | | 7/1941 | Swem |
| 2,326,484 A | * | 8/1943 | Moreton ...................... 210/329 |
| 2,549,363 A | * | 4/1951 | Blickman .................... 210/411 |
| 2,568,085 A | | 9/1951 | Naugle |
| 3,347,383 A | | 10/1967 | Augerot |
| 5,064,536 A | | 11/1991 | Bratten |
| 5,103,261 A | | 4/1992 | Matsuo et al. |
| 5,200,072 A | | 4/1993 | Frejborg et al. |
| 5,279,734 A | | 1/1994 | Nehls |
| 5,407,574 A | | 4/1995 | Hensley |
| 5,738,788 A | | 4/1998 | Tokiwa et al. |
| 6,109,450 A | | 8/2000 | Gruenwald et al. |
| 6,182,833 B1 | | 2/2001 | Zittel |
| 6,183,646 B1 | | 2/2001 | Williams et al. |
| 6,485,229 B1 | * | 11/2002 | Gunderson et al. ........... 405/63 |

OTHER PUBLICATIONS

International Search Report, International Application No. PCT/US 02/21966 (all pages).

* cited by examiner

Primary Examiner—Matthew O. Savage
(74) Attorney, Agent, or Firm—Cesari and McKenna LLP; Edwin H. Paul, Esq.

(57) ABSTRACT

An industrial, e.g. power plant cooling, water extraction framed cartridge filter system is disclosed with a holed fabric type medium to filter debris from the power plant cooling water. The fabric type filter medium is comprised a one or more strength meshes of nylon or another strong fiber and an inner polypropylene or polyester medium with small holes. The size of the frame and the number and arrangement of the holes are arranged to supply a volume of filtered water consistent with the needs of the application at the typical pressures found therein. For a power plant, a system of many cartridges may be used to provide the total cooling/replacement water needs. Compressed air is introduced into the bottom interior of the cartridges and released via a valve at the top. The compressed air mechanically disturbs the filter medium to knock off any debris that may have attached to the filter medium surface and air escaping via the small holed in the filter may attach to and float small pieces of debris away. Each cartridge is fitted into a manifold conduit with cutoff valves to allow service of the cartridges.

4 Claims, 7 Drawing Sheets

COOLING MAKEUP WATER INTAKE CARTRIDGE FILTER FOR INDUSTRY

CROSS-REFERENCE TO RELATED APPLICATIONS

The present application claims the benefit of U.S. Provisional Patent Application Ser. No. 60/305,543, which was filed on Jul. 13, 2001, of common inventorship and which provisional application is hereby incorporated herein by reference.

BACKGROUND OF THE INVENTION

1. Field of the Invention

The present invention relates to industrial water intake filtration systems, and more particularly to cartridge filters that are benign to marine life forms.

2. Background Information

Industrial plants, e.g. power, chemical, refineries, water treatment plants and the like, may extract water from nearby adjacent water resources (ocean, river, or lake) for any of several purposes. Those purposes include, but are not limited to, cooling and/or make-up water for cooling towers and similar systems, facility or equipment cleaning, water supply, or other similar purposes.

The filters used in the above applications must exclude debris and entrainment of marine organisms to prevent damage and/or plugging of the filters and other downstream structures and to minimize the impact on marine life, respectively. A large number of mechanical systems have been employed as filters. These range from simple screens, rotating screens to sophisticated static and regenerable filters. Of course, such filters must be corrosion resistant.

Typical of such systems, power plants employ two primary types of water cooling. The first and most prevalent in older plants is "once through cooling." A plant employing this type of cooling inducts large quantities of cool water into a heat exchange system and then returns the water to its source at a warmer temperature. The second type of water cooling system, called a "recirculating cooling system," recirculates water within a mostly closed heat exchange system and uses cooling towers or ponds to reject absorbed heat to the atmosphere. A recirculating system withdraws lesser quantities of cool water from an external source to replenish losses due to evaporation and discharges. The most advanced recirculating cooling systems use a hybrid or wet/dry cooling tower to reduce the visible plume of evaporated water under certain atmospheric conditions. The present invention could be used to advantage on all types of water intake systems but is most likely to find application in make up water for recirculating cooling systems.

Cooling water used in power plants using recirculating cooling systems must be replenished for two primary reasons: evaporation and increased solids content (in some cases salinity). Typically a level detector at the cooling site, usually a cooling tower structure, determines when cooling water level is low, and a salinity detector determines when salinity is too high. When the cooling water level is low a pump will draw in new water from a nearby lake, river or ocean. When the salinity is too high some cooling water may be pumped out and new water drawn in to reduce the salinity to acceptable levels.

When cooling water is drawn from lakes, rivers or seas containing marine life, care must be taken to not disrupt the marine life balance. However, floating debris must be excluded, and live fish and plants, fish eggs, and smaller life forms must be excluded and insignificantly harmed, if at all. Filters are used for these purposes.

Also, the locations of the water intake system entry ports in the water must not impede any navigable channels.

One type of filter used in such applications incorporates a Wedge wire filter. One such filter is described in U.S. Pat. No. 5,064,536 that issued in July of 1991 to Bratten. This patent describes a closely spaced wedge shaped wire that allows water to flow through the gaps but retain solids, which are removed by backwashing, or scraping.

Wedge wire screens in practical applications consist of two components: support rods and a wedge-shaped wrap wire. Support rods and wrap wire are welded using a special process followed by heat treatment, which enhances the screen integrity by maintaining the metal's corrosion resistance. The flat base of the wedge shaped wrap wire is directed toward the fluid flow. This produces a very smooth unobstructed surface, which will not impede the free flow of materials across the screen surface.

Backwash systems are available for cleaning the wedge wire screens. During backwashing, the wedge produces a vortex that cleans more efficiently than perforated plate or flat wire screens.

Wedge wire screens can be constructed in a wide variety of shapes and sizes from a variety of corrosion resistant alloys such as stainless steels and nickel alloys. Wedge wire Tee and Drum systems reduce installation costs as they are easy to assemble and do not require costly support structures. Their non-clogging slot design results in low head losses and a reduction in downtime caused by plugged screens. The smooth surface design and rigid construction significantly reduces abrasion, increasing the effective life and resulting in longer intervals between cleaning cycles.

A single wedge wire screen cylinder may be used for small capacities while one or more Tee screens may be used for larger capacities.

However, wedge wire systems usually have openings and flow rates that impact marine organisms, and maintenance, replacement and other related tasks leave room for improvement.

Another type of filter used in similar applications incorporates a fabric boom filter. One such filter is described in U.S. Pat. No. 5,102,261 issued on Apr. 7, 1992 to Gunderson, III. This patent describes a full water depth filter curtain comprised of treated polypropylene/polyester fabric suspended by flotation billets on the water surface and secured in place with anchoring systems. The boom has a double fabric layer with an Air Burst Technology cleaning system.

However, a filter curtain such as in U.S. Pat. No. 5,102,261 requires a very large surface area to obtain a low "through screen" flow rate and this requires a very large boom that can impact a navigable water way. The filter curtain booms have openings on the bed and wall of the river, lake, or sea that impact marine organisms as the boom cannot be sealed against the waterway to ensure that marine organisms cannot enter the boom. Significant water flows (river of tidal) in the waterway can distort the boom and further exacerbate openings under the boom, anchoring of the boom, and impact the navigable waterway. Replacement, maintenance and/or repair of the boom requires removal of the boom from the waterway and this would either allow ingress of marine organisms into the intake or require the water abstraction be stopped during the period of boom removal.

SUMMARY OF THE INVENTION

In view of the foregoing background discussion, the present invention provides a cartridge and a multi-cartridge system approach where each cartridge has a replaceable fabric type filter. The cartridges provide an extended filter surface area, with a relatively small foot print, to reduce the through screen velocity to a velocity low enough to avoid entrainment and entrapment of marine organisms against the filter. The cartridge filter media is sealed to the frame to exclude marine organisms. The cartridges can be replaced without affecting operation the intake system. The cartridges are fitted onto a manifold system that collects the filtered water and channels it to the water intake system. The cartridges are arranged in a size and number and at a given flow rate to accommodate the water extraction needs of the facility and at the same time being benign to any marine organisms in the source of the water.

In one example, the fabric type filter is layered with a supporting mesh made of a strong material, like nylon in a preferred embodiment, usually sandwiching an inner medium to limit deformation of the filter media. The inner medium is porous and allows the water to pass while filtering out minute debris particles. The thickness of the fabric type filter may be arranged with multiple layers of strengthening mesh and inner mediums as determined by the application. The number and size of the cartridges and the number and size of the holes in the filter are arranged to supply the water extraction needs of the facility.

The fabric filter material has a matting of fibers that that has no designated opening size that sieves the water. The porosity of the filter is described as an Apparent Opening Size. There may be additional perforations in the fabric that range from as little as 0.01 mm to as high as 5.0 mm may be used to satisfy a particular need in a particular environment. The fiber matting and performation size can be made to exclude virtually all marine life.

In one example, the cartridges have a frame made of a long lived marine life benign structural material that defines an inner volume. The fabric type filter is then arranged to enclose completely that inner volume from the surrounding water. The cartridge frame is arranged with one or more exit ports.

A manifold engages the cartridge with entrance ports that mate with the cartridge exit ports to provide a water tight seal to exclude marine organisms. The manifold is preferably arranged to accept a number of cartridges, the number being a function of the needs of the power plant and the flow capacity of each cartridge.

In an embodiment a valve is arranged in the manifold that can close off the fluid connection from each cartridge. This allows each cartridge to be serviced without affecting the system operation. In some cases spare cartridges may be arranged to become operational when other cartridges are being serviced.

In another aspect of the invention, compressed air or other such gas is forced into the bottom of each cartridge and through an escape valve at the top of each cartridge. The expansion of the compressed air rising through the cartridge frame shakes the fabric type filter material to remove debris, and air escaping through the filter media may attach to particles and float them away.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
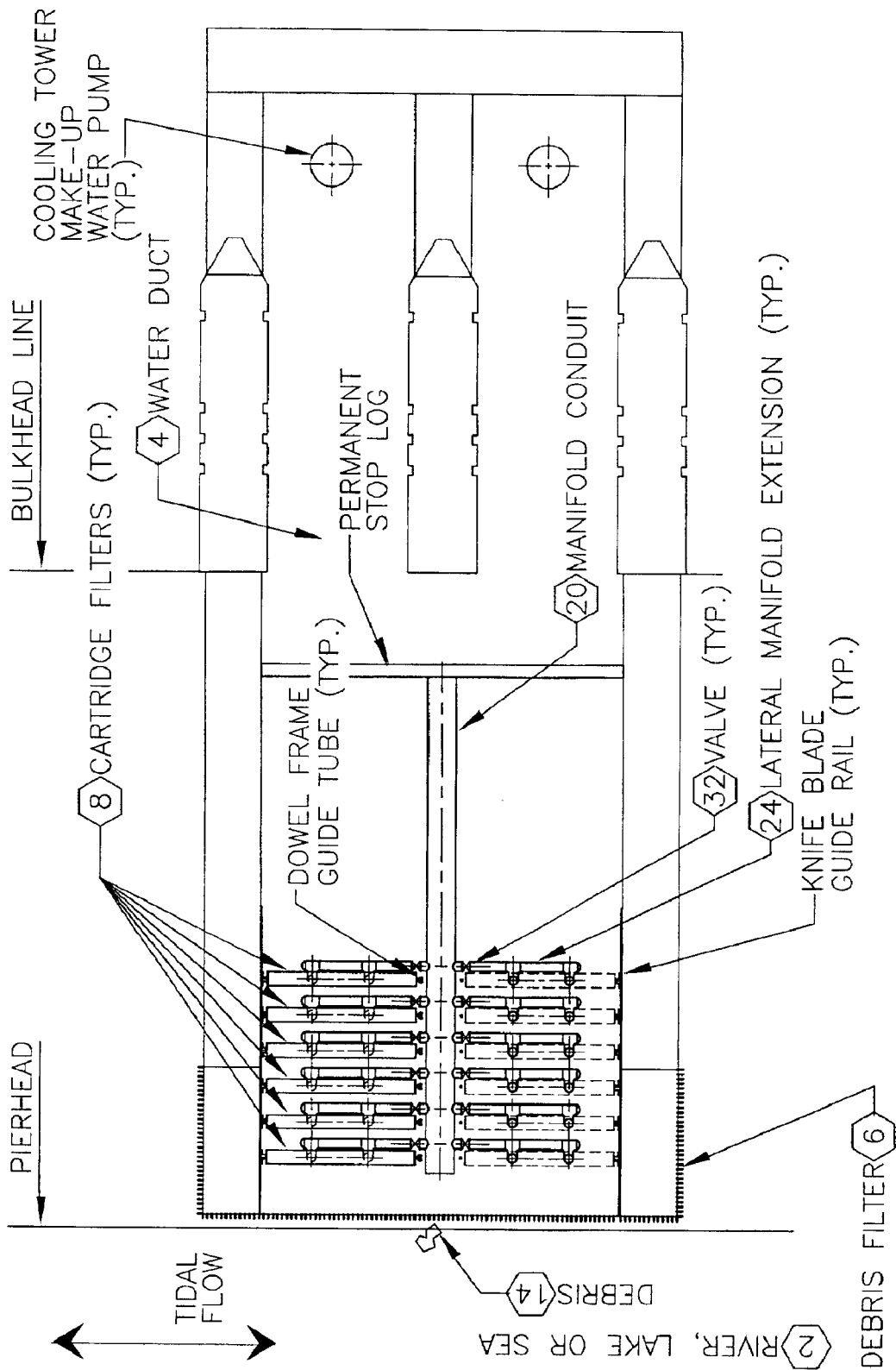
FIG. 1 is view of a water intake pier extending into a river or tidal flow.

FIG. 1 is a pictorial illustration of a pier containing a water duct 4 through which cooling water is drawn from a river or tidal flow 2 for use in a cooling tower or towers of a power plant or other water extraction needs for a facility. There is a debris filter 6 at the entrance in front of a number of cartridge filters 8 that accept water after it flows through the debris filter. The water is drawn through the fabric-type media in the cartridge filters on its way to the water duct 4. The flow of the river, or if tidal the flow of the tides and or the ocean currents if the pier extends into an ocean, is parallel to orientation of the debris filter and the cartridge filters. This orientation provides a natural flushing flow across the faces of the debris filter and the cartridge filters. The cartridges are orientated to minimize tidal or current flow directly into the fabric mesh sides of the cartridge filter to reduce impingement of marine organisms onto the filter surface.

Figure 2:
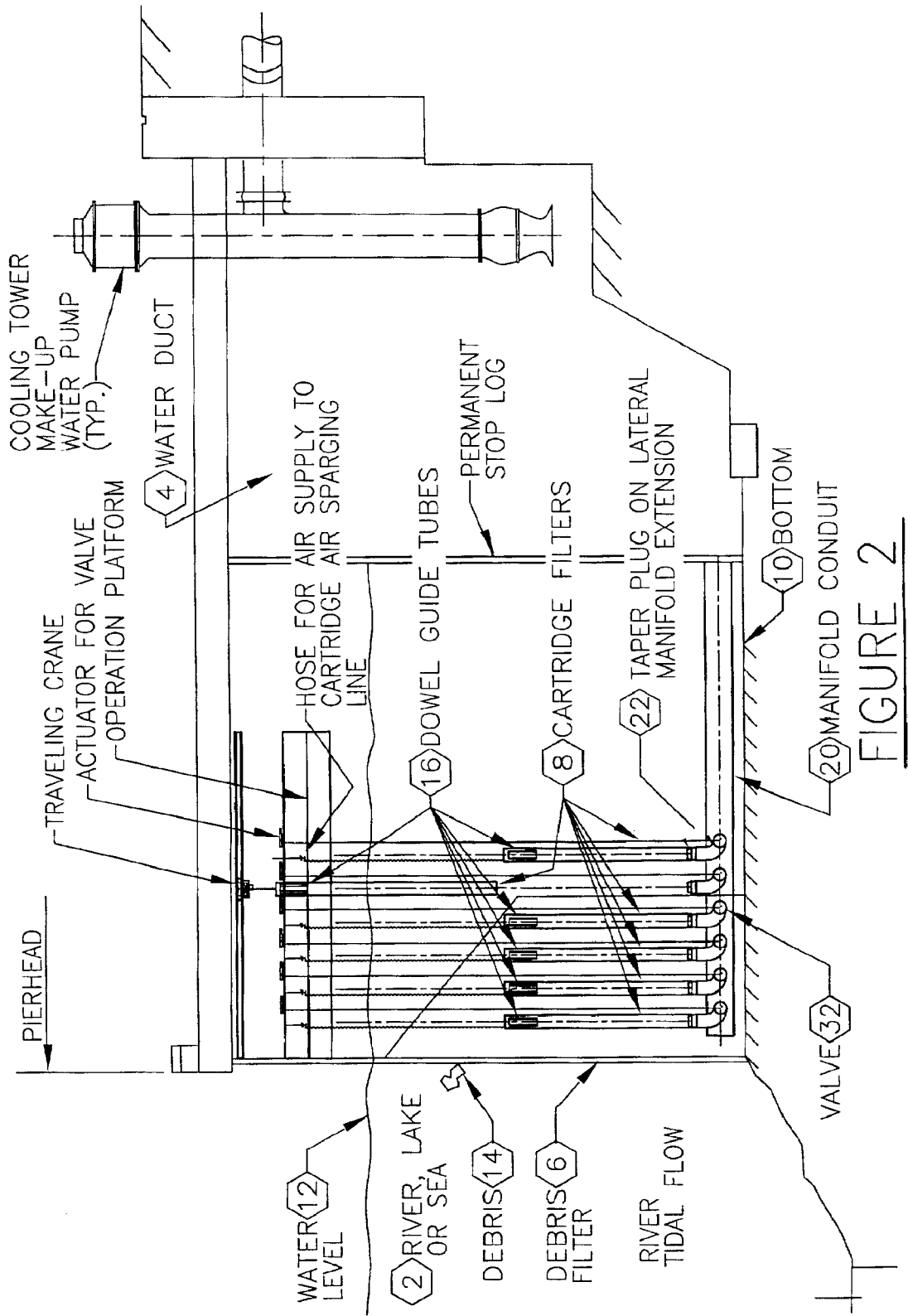
FIG. 2 is a pictorial showing the water extraction flow.

FIG. 2 is a side view pictorial of the pier, water intake system and water duct 4 resting in the water. The water duct 4 forms a sump that is isolated from the water source by a permanent stop log wall. All water entering the water duct 4 is channeled through the cartridge filters 8 and manifold 20. The debris filter 6 is a screen supported by vertical bars and a scraper or rake may be attached to remove the debris 14 from time to time. This debris filter also protects the cartridge filters from floating ice. The cartridge filters 8 are supported above the manifold 20 so that the filters do not rest on the bottom 10 of the waterway in order to prevent bottom dwellers and bottom sediment, silt, etc. from being drawn into the cartridge filters. The intake system is below the water level 12. Water flows through the debris filter 6 and surrounds the cartridges 8. The bottom of each cartridge is connected via two water outlets to a manifold 20 that is connected to all the cartridge filters. The manifold may have a valve 32 that closes off the water path to allow the filters to be inspected, cleaned, repaired or otherwise serviced while the intake system remains operational.

Figure 3:
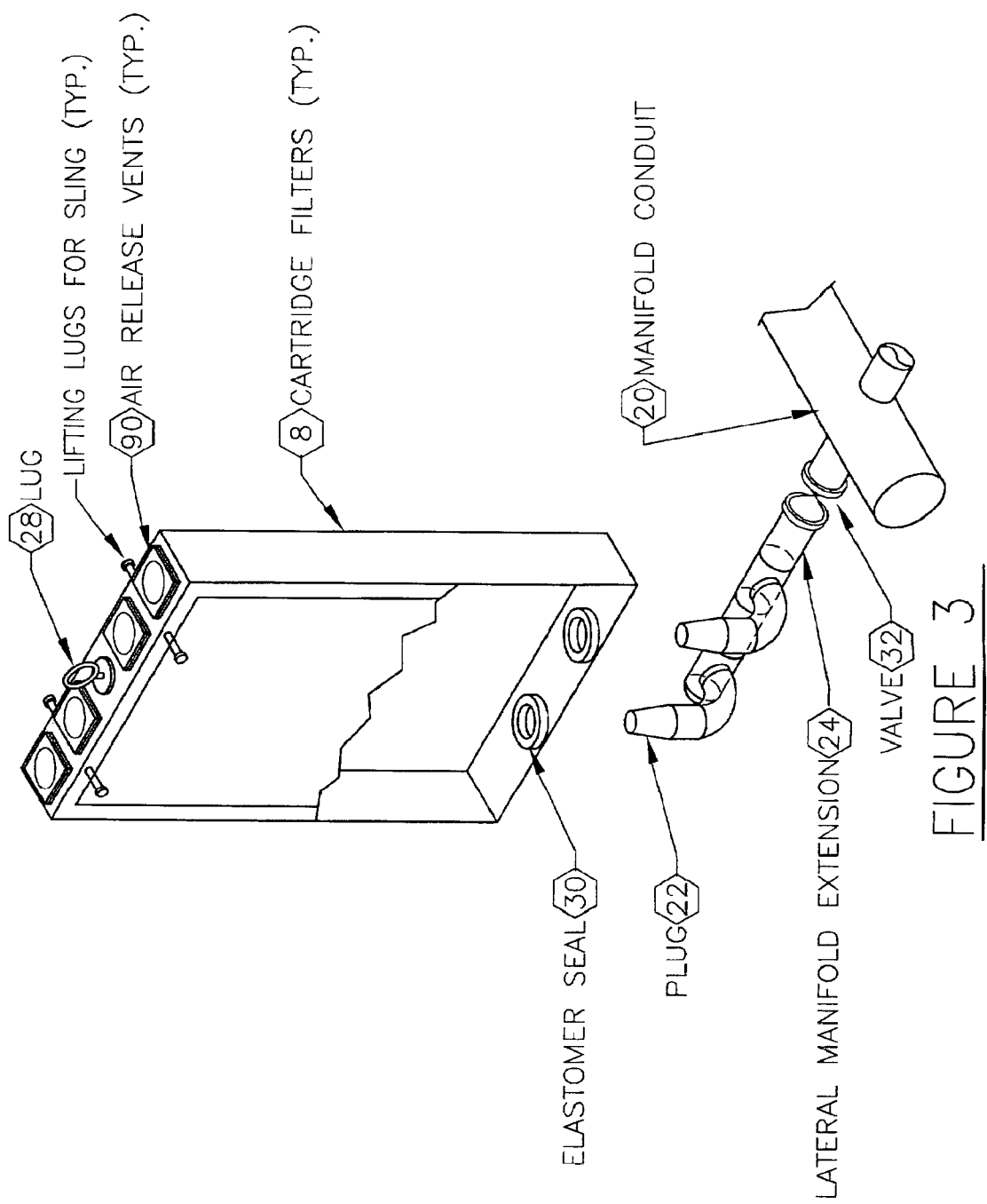
FIG. 3 is an isometric showing the filter cartridge and the receiving manifold.

FIG. 3 shows the tapered plugs 22 extending from the lateral manifold extensions 24. These outlets are tapered and fit into a corresponding opening with elastomer seal 30 on the bottom of the filter cartridge 8. The lateral manifold extensions 24 from the main the manifold conduit 20 attach to each cartridge 8 to direct water to the water duct 4. An elastomer seal 30 is configured to seal the cartridge around the tapered plugs 22 on the manifold extensions 24 when the cartridge is in place. The elastomer seal 30 is located on the cartridge frame so that when the filter cartridge is lifted the seals may be inspected and/or changed. A valve 32 is arranged in each lateral manifold extension 24 that isolates the extension for each filter allowing that filter to be serviced while the intake system remains operational. There are lugs 28 are on the top of the cartridge to allow lifting of the entire cartridge.

Figure 4:
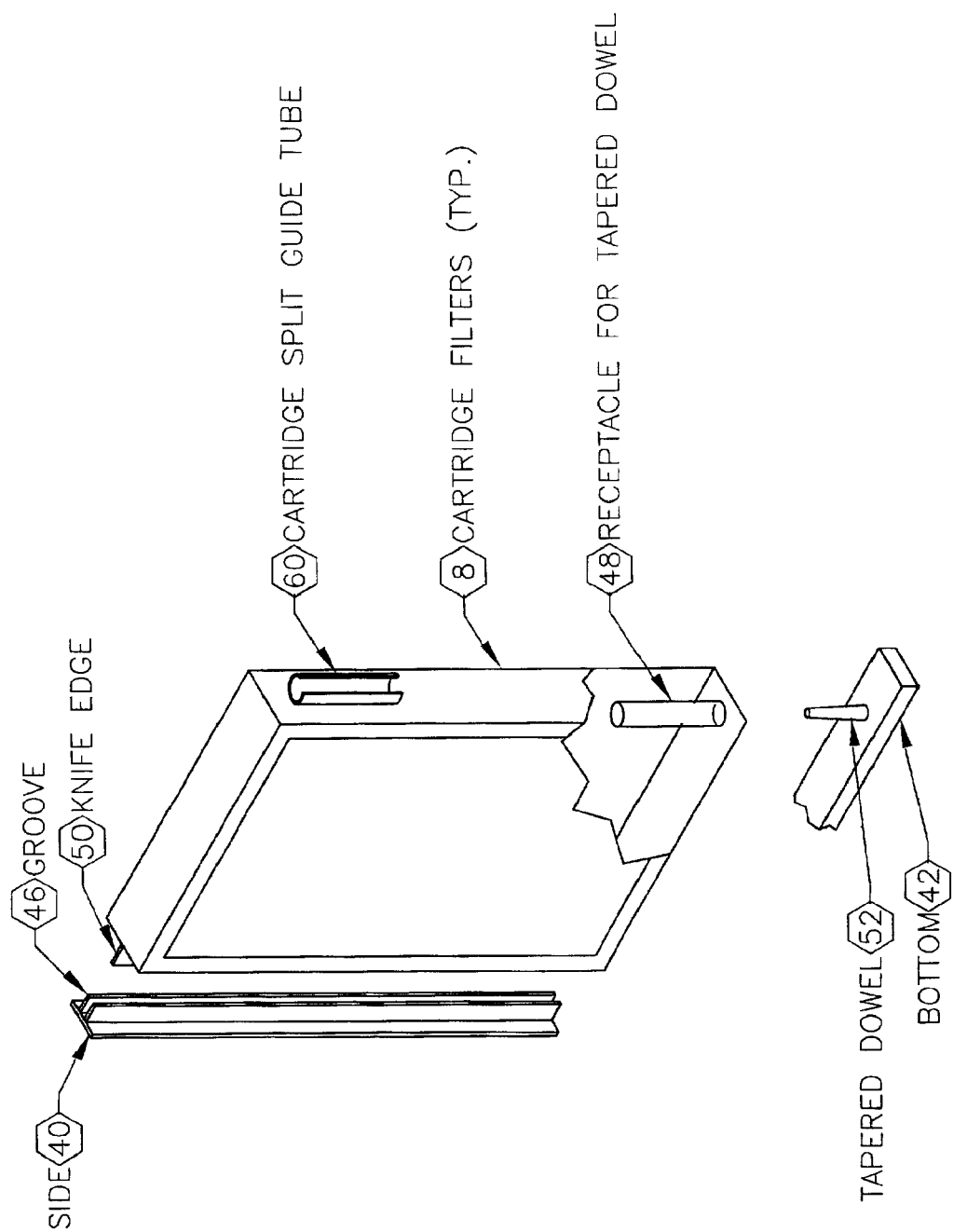
FIG. 4 is an exploded view of the mechanical attachments for securing the cartridge.

FIG. 4 shows the alignment mechanisms used for installing the cartridge filter onto the manifold. Framing members are shown for the one side 40, the bottom 42, and the other side 44. One side member 40 of the frame includes grooves 46, and there is a corresponding knife-edge 50 that mates respectively with the groove 46. The bottom of the cartridge has a receptacle 48 that mates with a tapered dowel 52 to positively align the elastomer seal opening 30 from the cartridge to the tapered plugs 22 on the manifold extension 24.

A cartridge split guide tube 60 is engaged on a guide dowel on the operator's platform (not shown). When installing the cartridge the operator first engages the guide dowel into the split guide tube 60 and lowers the filter and rotates the filter to engage the knife-edges on the far side of the cartridge into groove 46. The cartridge is lowered until the tapered dowel 52 is engaged into the cartridge receptacle 48. The split in the guide tube allows the support for the guide dowel to pass as the cartridge is lowered into place.

The alignment and support for such a cartridge filter may be accomplished in many different ways as are well known in the art. The above description is simplified but other details needed will be evident to those skilled in the art.

Figure 5:
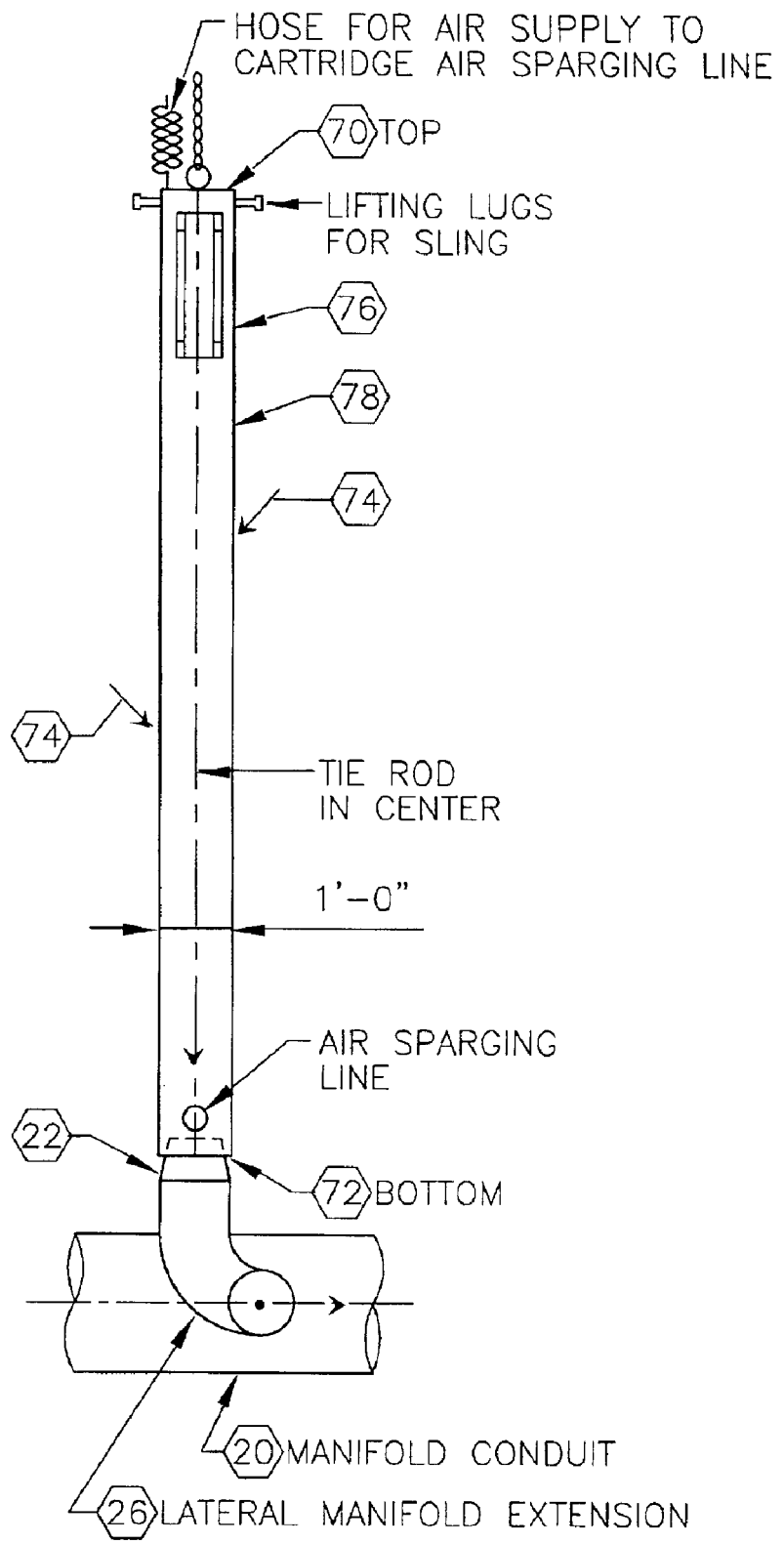
FIG. 5 is a sectioned drawing of the water flow in a cartridge.

FIG. 5 is a section drawing of a cartridge showing the top 70 and the bottom 72 of the frame. The frame is a 10 ft. 6 inches high by 14 ft. wide by 1 ft. depth fiberglass construction. The frame members are impervious and allow no water to penetrate. Water is only drawn through the filter mesh sides of the cartridge. However, other such constructions including fiberglass composites and other structural members covered with fiberglass and/or other such materials may be used. The materials, of course, should be long-lived and benign to marine life and environment in general. Water enters from either side through the fabric composite mesh intake. When holes or perforations are used the number, size and arrangement of the perforations can be varied to accommodate required water extraction flow rates. At typical operating conditions, the cartridge filters are sized to draw about five gallons per minute of water through the fabric filter media. In this instance the water flow velocity through the fabric filter is less than 0.02 ft/sec (fps), but other designs may have flow velocities of less than 0.001 fps. The filters through screen velocity may be designed for the specific application to be benign to marine organisms. The numbers of filter cartridges are determined by the quantity of water needed. In one preferred embodiment enough cartridges are installed to provide water flows of 15,000 gpm, with about 1,250 gpm provided by each cartridge. Other sizes and numbers of filter cartridges can be used to meet virtually any water extraction requirements. Flow recorders may be used to monitor flows parameters.

Figure 6:
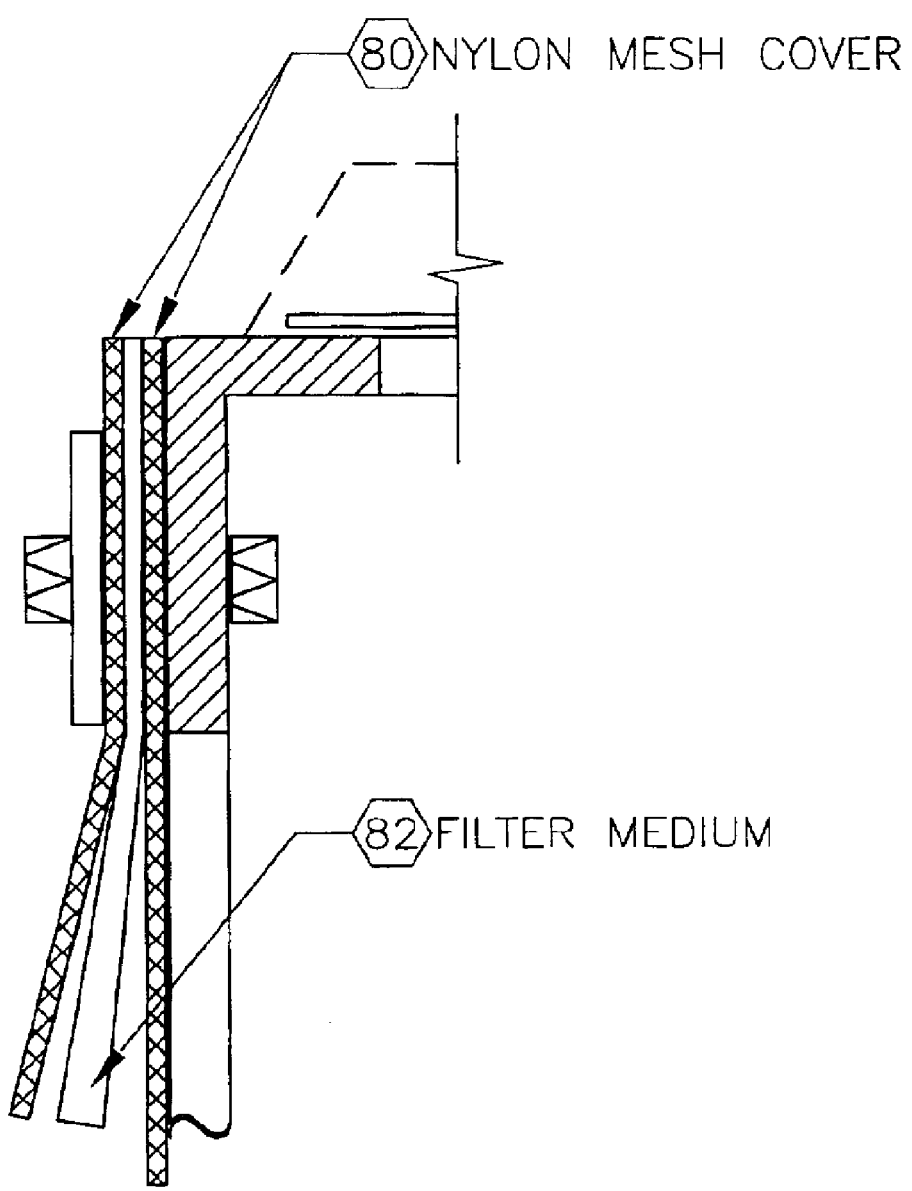
FIG. 6 is a sectioned drawing of the filter mesh medium.

FIG. 6 is a cutaway drawing of the fabric filter mesh. There are two nylon mesh covers 80 on either side of a filter medium 82. The nylon provide strength and limit the deformation of the filter media, the mesh can be in the 2–10 mm range. Preferably the filter medium is made of polypropylene an/or polyester fabric. Such a fabric can be found under the trademark GUNDERBOOM, owned by Gunderboom, Inc. of Anchorage, AK. The filter medium can be a single layer, but multiple layers of the filter fabric and/or nylon or other such support fabrics can be used to advantage. Filter fabric thicknesses can be varied over a wide margin depending on the particular application. Thickness from one mm or less to more than tens of mm can be used. The flow rates required and the sizes and number of the filter cartridges together with the flow capacity of the filter medium determines the thickness of the filter medium.

Figure 7:
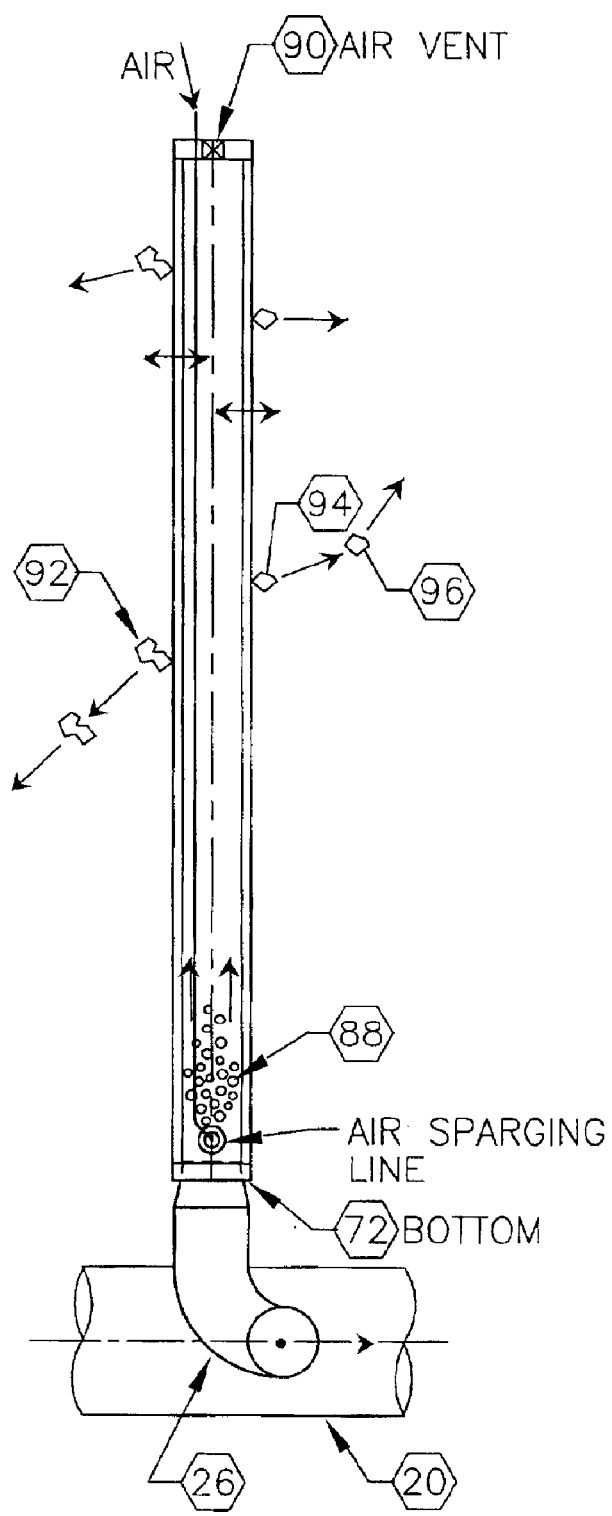
FIG. 7 is a sectioned drawing of the air bubble cleaning mechanism.

The filter cartridges are cleaned of debris and silt build up by forcing air bubbles into the cartridge as illustrated in FIG. 7. The air bubbles 88 are introduced by a compressed air line at the bottom of the cartridges 8 and expand as the air rises through the cartridge frame. An air escape valve 90 is provided at the top to allow the air to escape. The mechanical agitation of the air bubbles shakes the filter sides of the cartridge thereby shaking off any accumulated matter 92. Some air escapes through the small holes in the filter mesh and will attach to small pieces of debris and float it to the surface 96 where is can be skimmed off or flushed away.

In practice filter cartridges are held in reserve in case of failure, and the valve system (32 of FIG. 3.) allows faulty filter cartridges to be quickly removed from supplying water while facilitating the addition of those reserved cartridges to the system with no interruption to the water extraction operation.

The polypropylene/polyester media provides other advantages. The water flow velocity is low, and the holes in the filter medium are small, virtually eliminating entrapment and impingement of, and therefore the destruction of marine organisms in the intake water. Prior art wedge wire filters typically have 2 mm exclusion sizes as compared to the <0.5 mm of the filter media fitted to the present invention. Reductions in the impact on marine organisms, compared to the wedge wire filters, can be in the order of 99% using fabric filter media fitted to the present invention. Fabric media porosity and perforations, filter area can be designed to provide through screen flow velocities that are benign to marine life organisms, where the smaller the better. This is not a linear calculation for when the smallest egg or fish fry size is excluded from being ingested in with the cooling water, that species is virtually free from impact of the water extraction being used.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. An industrial cartridge for filtering cooling water in a filtration system having a pump for drawing water through the industrial cartridge, the cartridge comprising:

a frame surrounding an interior volume, a fabric filter material attached to the fame and enclosing the interior volume, wherein the fabric filter material is arranged to pass water, and wherein the fabric filter material defines a first surface that accepts water from a source and a second surface arranged in fluid connection with the pump to deliver filtered cooling water therefrom, wherein the frame and fabric filter material are benign to marine life, and a multitude of perforations arranged in the fabric filter material wherein the cooling water passes through the perforations, a bottom of the frame defining an outlet to permit filtered water to exit said cartridge, an air sparging line defining an air entrance near the bottom of said frame to allow compressed air to enter said interior volume, and an air escape valve on a top of said frame through which the compressed air may escape from said interior volume.

2. The cartridge as defined in claim 1 further comprising at least one layer of a mesh cover in intimate contact with the fabric filter material, and wherein both said layer and fabric filter material are benign to marine life.

3. The cartridge as defined in claim 2 where the mesh cover is formed of nylon and the fabric filter material is formed of polypropylene or polyester.

4. The cartridge as defined in claim 1 wherein the sizes of the perforations range from 0.01 mm to 5 mm.

* * * * *